Jan. 17, 1967   F. T. ZUKLEY   3,298,231
FLOAT ASSEMBLY OR UNIT FOR LIQUID LEVEL CONTROL DEVICES
Filed Oct. 15, 1964

INVENTOR
FRANK T. ZUKLEY

BY  *B. P. Fishburn, Jr.*
ATTORNEY

3,298,231
FLOAT ASSEMBLY OR UNIT FOR LIQUID LEVEL CONTROL DEVICES
Frank T. Zukley, Sauk Village, Ill., assignor to Hamilton Humidity, Inc., Chicago, Ill., a corporation of Illinois
Filed Oct. 15, 1964, Ser. No. 404,114
7 Claims. (Cl. 73—322.5)

This invention relates to a float assembly or unit for liquid level control devices.

An object of the invention is to provide a highly economical and efficient float unit formed of materials which will not corrode or rust in water, acid and other substances normally found in humidifiers and the like.

Another important object of the invention is to provide a float unit which is quickly adjustable over a considerable range without employing screw-threads, lock nuts and the like.

Another object is to provide a float unit consisting of three simplified economical parts which are easy to assemble permanently in a novel manner.

Another object is to provide a float unit which is free-swiveling and cannot bind or twist with respect to the valve control lever with which it is associated, the float unit exerting only true vertical forces on the lever and being unaffected substantially by turbulence in the liquid or contact with objects in the liquid reservoir.

Still another object is to provide a float unit which may be adjusted relative to the valve control lever in fixed predetermined increments of adjustment, allowing use of the same valve assembly throughout the country in various locations where water pressure may vary considerably.

Other objects and advantages of the invention will be apparent during the course of the following detailed description.

In the accompanying drawings forming a part of this application and in which like numerals are employed to designate like parts throughout the same, FIGURE 1 is a fragmentary vertical cross section through a tank having a liquid level control valve including the float assembly embodying the invention;

Figure 1:
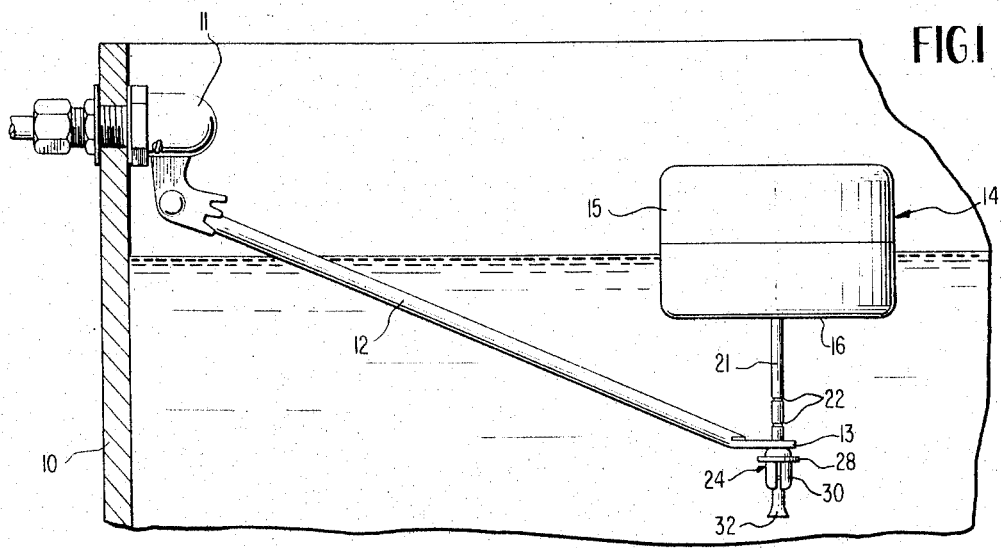

In the drawings wherein for the purpose of illustration is shown a preferred embodiment of the invention, the numeral 10 designates a liquid reservoir or tank whose liquid level it is desired to control by means of a conventional valve 11 having a vertically swingable control lever 12 formed of brass or the like, having a flattened integral apertured extremity 13 which is approximately level or horizontal in the normal position of the lever. This much of the construction is entirely conventional and need not be dealt with in further detail. The float assembly or unit now to be described may be employed in connection with various types of liquid level control devices and in various applications or environments utilizing such devices, such as humidifiers, toilet flush tanks and other like means.

Figure 4:
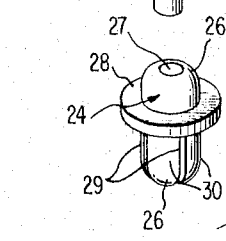
FIGURE 4 is a longitudinal vertical section through the float assembly showing one adjusted position of the retainer and one method of assembling the retainer with the float pin or stem.
Figure 4:
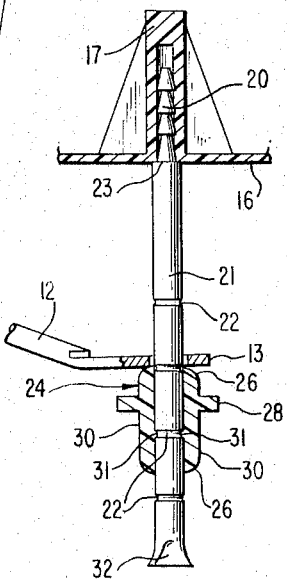
Figure 5:
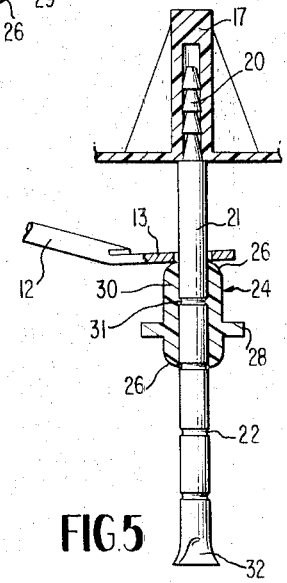
FIGURE 5 is a similar view showing a second method of assembling the retainer with the stem.

The float unit of the present invention is designated in its entirety by the numeral 14 and comprises a thin walled hollow generally cylindrical float body 15 formed of bronze polypropylene or other like plastic material. The bottom wall 16 of float body 15 has a central upstanding slender boss 17 anchored thereon and reinforced externally by webs or braces 18. The boss 17 has a bore 19 closed at its top well within the interior of the float body and opening through the bottom wall thereof. This bore 19 receives very snugly the reduced barbed extension 20 of a brass cylindrical float pin or stem 21 having a plurality of preferably equidistantly spaced annular grooves 22 or recesses formed therein as shown in the drawings. The float body 15 is assembled with the stem 21 permanently by simply forcing the barbed extension 20 into the bore 19 until the shoulder 23 of the stem abuts the float bottom wall 16 as shown in FIGURES 4 and 5. The extension 20 bites firmly into the wall of boss 17 and securely anchors the float body to the stem 21 with the latter centrally located and extending axially of the float body. An adjusting and retaining element 24 formed of bronze, polypropylene or like material, and preferably produced by a simple injection molding process, is adapted to be mounted on the stem 21 permanently, as shown. The element 24 constitutes an important feature of the invention in rendering the float unit quickly adjustable with respect to the lever 12 and also free-acting and non-binding on the lever.

Figure 3:
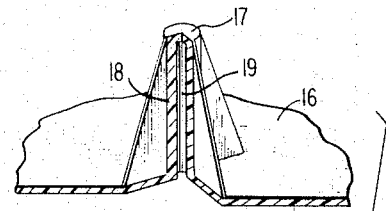
FIGURE 3 is a central longitudinal vertical section through an adjustable plastic retainer.
Figure 3:
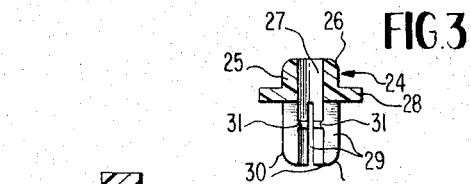
Figure 2:
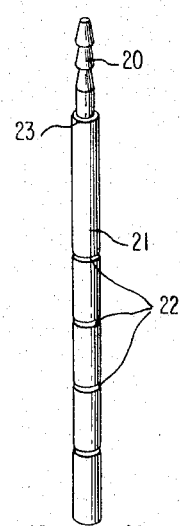
FIGURE 2 is a fragmentary exploded perspective view of the float assembly on an enlarged scale and partly in section.

The retainer element 24 has a generally cylindrical body portion 25, substantially spherically rounded as at 26 on both ends thereof. The retainer element has a cylindrical through bore 27 adapted to receive the stem 21 snugly although slidably. The element 24 has an external flange 28 intermediate its ends to aid in the manual manipulation of the retainer element along the stem 21 for adjusting the unit. The flange 28 is arranged relatively near one end of the retainer element. The end of the retainer element which is more remote from the flange 28 has a pair of transverse cuts of slots 29 formed therethrough transversely, the slots intersecting at right angles, FIGURE 3. These slots extend from the flange 28 through the remote end of body portion 25 and, in effect, form on the retainer element four circumferentially spaced somewhat resilient gripping arms 30. Intermediate the ends of the gripping arms 30 and upon their inner sides are formed small detent projections 31 which are rounded and adapted to enter the correspondingly shaped adjustment grooves 22 of float stem 21.

The arrangement is such that the retainer element 24 may be shifted along the stem 21 readily with the fingers and the detent projections 31 will snap readily into the grooves 22 to provide the selected adjustment of the float unit relative to the lever 12. The tension in the gripping arms 30 is sufficient to firmly hold the element 24 at any one of the several possible positions on the stem 21 made possible by the provision of the grooves 22. For example, about four of the grooves may be provided and spaced apart about 5/16ths of an inch. The spacing may vary according to requirements and the size of the float assembly may vary as found desirable.

As depicted in FIGURES 4 and 5, the adjusting and retainer element 24 may be applied to the stem 21 in opposite directions or from either end of the element 24. This means that with a definite spacing between the adjusting grooves 22 of the stem and with the detent projections 31 arranged closer to one end of the element 24 than the other end thereof, the range of adjustment for the same element 24 on the identical stem 21 may be changed significantly as depicted in FIGURES 4 and 5.

Either rounded end 26 of the element 24, depending upon the assembly method, FIGURES 4 and 5, will engage the lower side of flat extremity 13 of lever 12.

The opening through the extremity 13 is large enough to receive the stem 21 quite loosely, as shown. The rounded ends 26 assure free swiveled engagement at all times between the stem 21 and lever 12 so that there can be no binding of the float unit and lever and so that the float will exert only a true vertical force on the lever 12 at all times and will be unaffected by turbulence in the liquid or by contact with some object, etc. The dissimilar materials, plastic and metal which make up the elements 24 and 13, aid in the free swiveled connection between the float unit and valve lever. It is thought that the advantages of the construction are readily apparent to anyone skilled in the art and that the operation of the device as now described is quite obvious.

After the parts are assembled, the end of the stem 21 remote from the float body may be peened over or deformed as at 32 to effect a permanent assemblage of the parts of the float unit. The construction is highly simplified, very economical, and highly reliable, efficient and foolproof in operation. Adjustment can be quickly achieved over substantially any desired range and in regular increments. There are no parts which may rust or bind and there is a complete absence of screw threads, lock nuts and like metallic fasteners which notoriously bind in water, etc.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A float assembly comprising a hollow float body, a stem anchored to said float body and projecting exteriorly thereof, said stem having a plurality of longitudinally spaced recesses therein, a somewhat resilient tubular adjusting and retainer element movably mounted upon the stem and having at least one rounded end for free swiveling engagement with a valve control lever, said element having at least one cross slot in one end portion thereof forming resilient gripping arms on the element, and detent projections on the inner sides of said arms adapted for releasable interlocking engagement with said recesses.

2. A float assembly comprising a hollow float body, a stem anchored to said float body and projecting exteriorly thereof, said stem having a plurality of longitudinally spaced grooves, a somewhat resilient tubular adjusting and retainer element slidably mounted upon said stem and having opposite ends which are rounded for free swiveling contact with a valve control lever, said element having cross slots in one end portion thereof forming resilient gripping arms on the element, and detent projections on the inner sides of said arms adapted for releasable interlocking engagement with said grooves.

3. The invention as defined by claim 2, and wherein said stem is metal and said adjusting and retainer element is a one-piece molded plastic element having an external finger gripping flange to aid in adjusting the element on the stem.

4. The invention as defined by claim 2, and wherein said float body is formed of plastic and has an opening in one end thereof, and a barbed extension on the stem insertable within said opening to firmly anchor the float body to the stem.

5. The invention as defined by claim 4, and wherein the stem has a shoulder at the base of the barbed extension to limit the insertion of the barbed extension into said opening.

6. The invention as defined by claim 2, and wherein the end of said stem remote from the float body is deformed and enlarged after assembly of said adjusting and retainer element with the stem so that the element and stem are permanently assembled.

7. The invention as defined by claim 2, and wherein said detent projections are located unequal distances from the opposite ends of said element, whereby the element may be assembled with the stem from either end of the element to provide a variation in the extent of adjustment between the element and stem without changing the location and spacing of said grooves.

References Cited by the Examiner

UNITED STATES PATENTS

| 1,972,331 | 9/1934 | Dean | 137—426 |
| 2,524,699 | 10/1950 | Friedl | 73—322.5 |
| 3,177,502 | 4/1965 | Meunier | 4—228 |
| 3,194,258 | 7/1965 | Grant | 137—451 X |

FOREIGN PATENTS

| 201,035 | 1/1939 | Germany. |

LOUIS R. PRINCE, *Primary Examiner.*

DANIEL M. YASICH, *Assistant Examiner.*